Aug. 30, 1955   C. W. SCHUTTE   2,716,305
RODENT POISON HOLDER
Filed July 2, 1953

Charles W. Schutte
INVENTOR.

BY *Clarence A. O'Brien*
*and Harvey B. Jacobson*
Attorneys

United States Patent Office 2,716,305
Patented Aug. 30, 1955

2,716,305

RODENT POISON HOLDER

Charles W. Schutte, Beaver Falls, Pa.

Application July 2, 1953, Serial No. 365,634

2 Claims. (Cl. 43—131)

The present invention relates to new and useful improvements in devices for the extermination of rats and other rodents and more particularly to a holder in which poisoned bait is placed in a manner accessible only to the type of animal to be destroyed.

An important object is to equip a shipping carton with an entrance chamber for the animal and behind which a paper bag containing the bait is placed and scoring a panel in the front end of the carton to provide an entrance opening by means of which the animal may enter the chamber and forming a rear opening in the chamber by means of which the animal may reach the bait.

Another object is to provide a poison bait holder which eliminates the danger to domestic animals by the scattering of the bait.

A further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
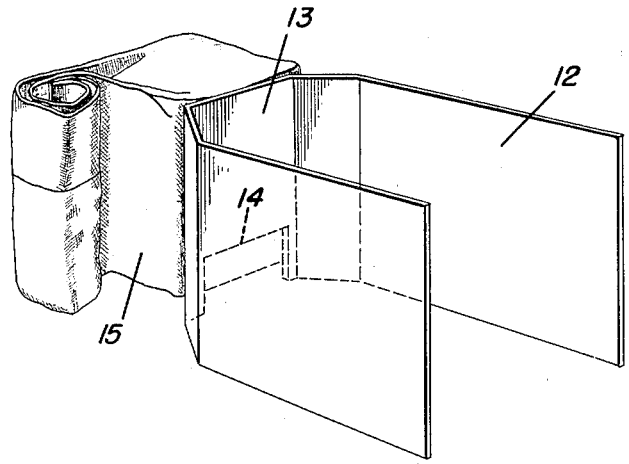
Figure 1 is a perspective view of the animal entrance chamber.
Figure 2:
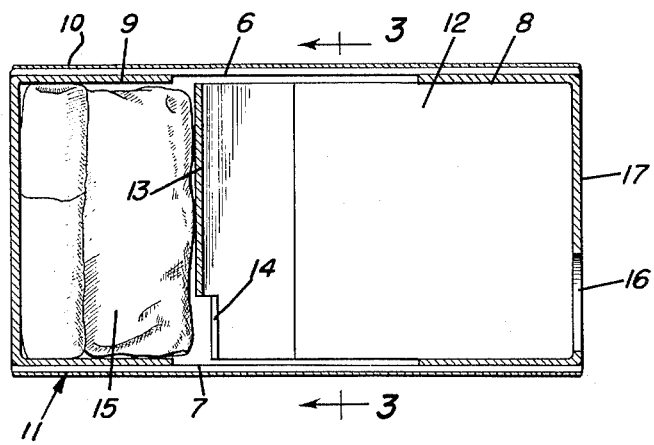
Figure 2 is a longitudinal sectional view of the carton showing the entrance chamber and bag containing the bait therein.
Figure 3:
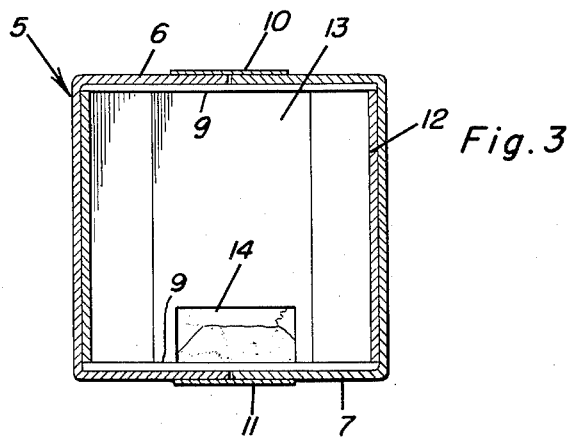
Figure 3 is a transverse sectional view taken on a line 3—3 of Figure 2.

Referring now to the drawing in detail, wherein for the purpose of illustration I have disclosed a preferred embodiment of my invention, the numeral 5 designates a conventional type of cardboard carton and which includes the usual top and bottom flaps 6 and 7 and end flaps 8 and 9. The top and bottom flaps are secured in closed position by gummed tapes 10 and 11 to seal the carton and the end flaps are folded inside the top and bottom flaps.

An animal entrance chamber 12 of substantially U-shape is placed inside the carton with its wall portion 13 positioned transversely of the carton to form a partition therein and which is provided with an opening 14 at its lower portion. A paper bag 15 contains the poison bait and is placed in the carton behind the partition 13.

An opening 16 is formed in the lower portion of the front end wall 17 of the carton along a predetermined score line (not shown) to form an entrance by means of which an animal may enter the chamber 12 and reach the bait by way of the opening 14.

The carton is packed at the factory with the bag of bait 15 and entrance chamber 12 and the carton is then sealed and shipped to the user who then makes the opening 16 in the front end of the carton and the device is then ready for use. The animal enters the chamber 12 and after feeding on the poison bait leaves the chamber by way of the opening 16 and later dies away from the carton.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A poison bait holder comprising a box-like member, and a U-shaped member loosely placed in the box-like member and forming a partition therein to separate the box-like member into front and rear compartments, said rear compartment being adapted to hold a bait container, said box-like member having an entrance opening to admit animals into the front compartment, and said partition also having a feeding opening therein and through which the animal may reach the bait, said U-shaped member including spaced apart parallel side members abutting a wall of the box-like member in the region of the entrance opening and said partition abutting the bait container to mutually restrain shifting of the bait container and the U-shaped member in the box-like member.

2. As a new article of manufacture, a sealed shipping carton having a disruptible bait container in one end, an animal entrance chamber in the other end of the carton and comprising a U-shaped cardboard member arranged with its leg portions positioned toward said last named end of the carton and having its bight portion forming a transverse partition in the carton adjacent the bait container, said partition having an opening to afford access to the bait container, and a removable panel integrally formed with said last named end of the carton to provide an entrance opening for admitting an animal into the entrance chamber.

References Cited in the file of this patent

UNITED STATES PATENTS 1,309,606    Bartholomew _____ July 15, 1919